United States Patent

[11] 3,607,001

[72] Inventors Edward Z. Finfer;
Michael H. Maurer, both of New York, N.Y.
[21] Appl. No. 693,230
[22] Filed Dec. 26, 1967
[45] Patented Sept. 21, 1971
[73] Assignee Chemical Construction Corporation
New York, N.Y.

[54] REMOVAL OF SULFUR OXIDES FROM WASTE GASES
12 Claims, 1 Drawing Fig.

[52] U.S. Cl. .................................................. 23/2 R,
23/178 S, 204/98, 204/99
[51] Int. Cl. .................................................. B01d 53/34,
C01b 17/56
[50] Field of Search ....................................... 23/2, 178,
210, 221; 204/98, 99

[56] References Cited
UNITED STATES PATENTS
3,134,729  5/1964  Kerti .............................. 204/99
3,331,661  7/1967  Boiston et al. ................. 23/121
3,475,122  10/1969 McRae et al. .................. 23/178

Primary Examiner—Earl C. Thomas
Attorney—J. L. Chaboty

ABSTRACT: Sulfur oxides are removed and recovered from waste gas streams such as flue gas, by scrubbing the gas stream with an aqueous alkali solution. The solution absorbs the sulfur oxides, which react with alkali to form alkali sulfite and sulfate in solution. The resulting solution is cooled to precipitate solid alkali sulfite and sulfate, which are separated from the residual solution and dissolved in an aqueous anolyte solution containing sulfuric acid and alkali sulfate. The alkali sulfite reacts with the sulfuric acid to form further alkali sulfate in solution and liberates a concentrated sulfur dioxide gas stream, which is withdrawn as a product of the process. The aqueous alkali sulfate solution is electrolyzed in a mercury cathode electrolytic cell, to produce a mercury-alkali metal amalgam at the cathode which is withdrawn and reacted with water to produce product hydrogen gas, aqueous alkali hydroxide solution and regenerated mercury. The aqueous alkali hydroxide solution is added to the residual solution from alkali-sulfite-sulfate precipitation, and the combined solution is recycled for further gas scrubbing. The anode of the cell produces product oxygen gas and an aqueous sulfuric acid-alkali sulfate anolyte solution, which may be processed to remove excess sulfuric acid. The anolyte solution is then employed to produce gaseous sulfur dioxide.

PATENTED SEP 21 1971
3,607,001
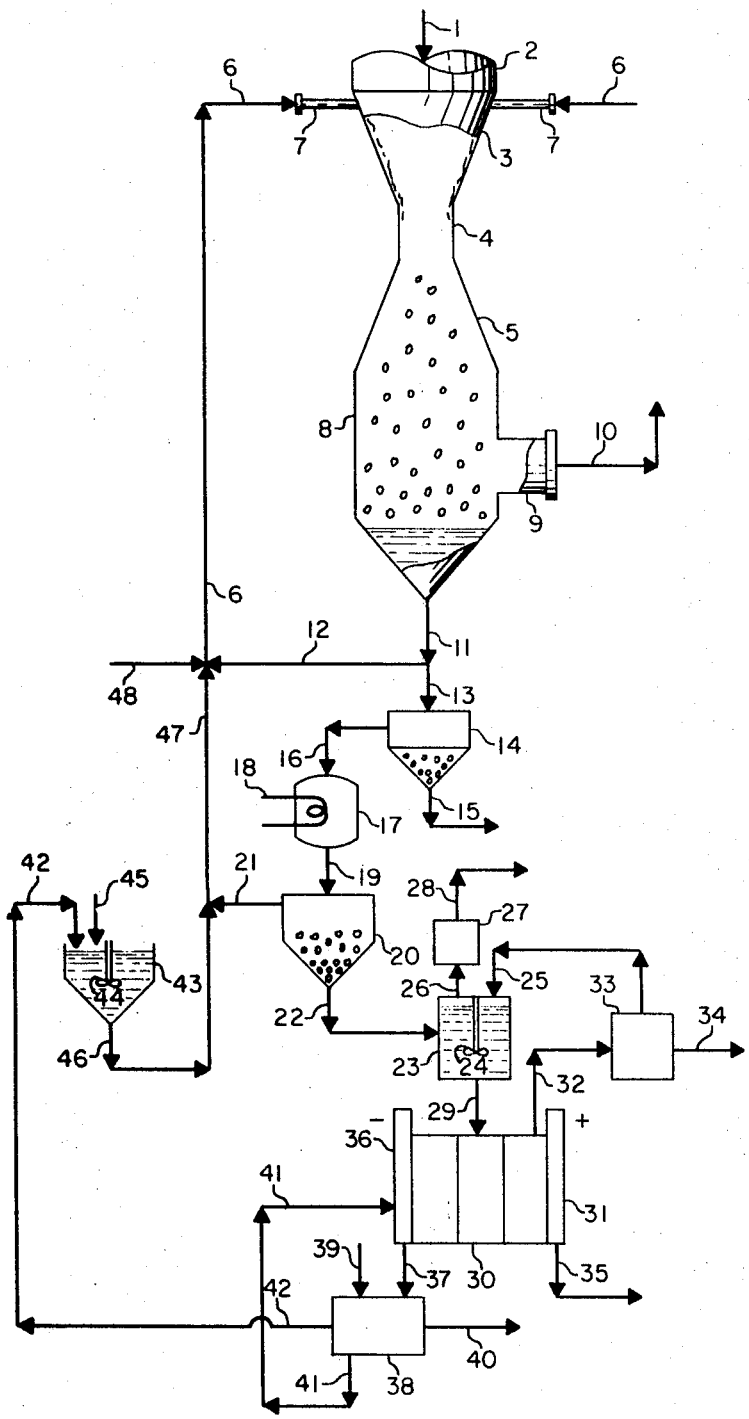
EDWARD Z. FINFER
MICHAEL H. MAURER
INVENTORS.
BY *D.T. Chaboty*
AGENT

REMOVAL OF SULFUR OXIDES FROM WASTE GASES

BACKGROUND OF THE INVENTION

1. Field of the Invention

The invention relates to the removal of a sulfur oxide contaminant, particularly sulfur dioxide, from a waste gas before the waste gas is released to the outer air, so as to prevent air contamination, and the recovery of the contaminants in the form of a concentrated sulfur dioxide gas stream, which is a useful commercial product. The invention is particularly applicable to the removal of sulfur dioxide from the waste gases of power plants, steam generators, space heating boilers and chemical plants such as sulfuric acid production facilities and organic sulfonation processes.

2. Description of the Prior Art

Numerous systems have been proposed or developed for the removal of sulfur oxides, principally sulfur dioxide, from a waste gas stream such as flue gas, and for the recovery of the sulfur oxide in a usable form as a commercial product. U.S. Pat. Nos. 2,100,792 and 2,161,056 deal with the use of zinc oxide for this purpose, and other zinc oxide processes are described in "Industrial and Engineering Chemistry," Aug. 1940, P. 1037-1049. The electrolysis of zinc sulfate is described in U.S. Pat No. 1,969,567, and French Pat. No. 973,573 deals with the electrolysis of sodium sulfate. The use of elastomeric permselective membranes in electrolysis of salt solution is described in U.S. Pat Nos. 2,978,393 and 2,978,401

The use of caustic as a scrubbing agent is discussed in U.S. Pat. No. 1,271,899 and British Pat. Nos. 132,661 and 1427 of 1883. In some processes, such as U.S. Pat. Nos. 1,589,133 and 2,173,778, the sulfur dioxide is liberated from the absorbing solution by simple application of heat or vacuum. Other pertinent patents include U.S. Pat. Nos. 1,034,574; 2,122,544 and 2,195,980.

SUMMARY OF THE INVENTION

In the present invention, a waste gas stream containing sulfur oxides, such as flue gas derived from the combustion of a carbonaceous liquid or solid fuel, is scrubbed with an aqueous alkali solution. The alkali is preferably sodium hydroxide or potassium hydroxide. The sulfur oxides are removed from the waste gas and dissolved in the solution as alkali sulfite and sulfate. Thus, the invention is particularly applicable as an air pollution control system, where it is required to prevent the emissions of quantities and concentrations of sulfur dioxide to the outer air which are above the limits specified by air pollution control regulations and laws.

Waste gases such as flue gas containing fuel ash, about 0.20% sulfur dioxide, 0.0025% sulfur trioxide, and 12% carbon dioxide, are drawn or forced through a scrubber absorber. Sulfur dioxide and sulfur trioxide are absorbed, and the fuel ash is collected by the liquid as it moves through the scrubber absorber. The liquid is an aqueous solution of a soluble alkali which may also contain recycle sulfite and sulfate. Sulfur dioxide and trioxide react with the alkali to form alkali sulfite and sulfate respectively. An oxidation inhibitor is usually added to the makeup water to the scrubber absorber to minimize oxidation of the sulfite.

The bleed stream from the scrubber absorber system containing the dissolved salts and suspended fuel ash enters a clarifier or filtration means, where the fuel ash is removed. The supernatant solution is cooled to precipitate alkali sulfite and sulfate crystals, which are separated from the solution. The solution is then recycled after addition of makeup alkali compound and water.

The solid alkali sulfite and sulfate crystals are charged into a reactor containing a dilute anolyte solution consisting of a dilute aqueous solution of sulfuric acid and alkali sulfate. The sulfite reacts with the sulfuric acid to form sulfate with the release of gaseous sulfur dioxide. The sulfur dioxide is a product of the process, and is usually purified, compressed and liquefied to produce product liquid sulfur dioxide, which is usable as a refrigerant, fumigant or for other commercial purposes. The sulfate entering the reactor does not take part in the reaction; hence the salts leaving the reactor are essentially alkali sulfate in aqueous solution.

The alkali sulfate solution is purified, and is then electrolytically decomposed in a mercury cathode cell to form an anolyte solution of sulfuric acid and residual alkali sulfate, with the concomitant formation of alkali metal hydroxide, hydrogen and oxygen. The sulfuric acid anolyte solution is used for the acidification of the alkali sulfite. The alkali metal hydroxide is recycled to the scrubber absorber and added to the gas scrubbing solution, with subsequent possible conversion to alkali carbonate by reaction with carbon dioxide in the waste gas. Hydrogen and oxygen gases are prepared for sales.

The production of sulfuric acid in the cell is in excess of that required for acidification of the sulfite when sulfates are formed in the scrubber absorber, which they would to some degree. Excess sulfuric acid is removed from the system at a point between the electrolytic cell and the acidification reactor.

The principal advantage of the invention is the attainment of highly efficient removal of typically 95% or more of the sulfur oxides present in dilute concentrations such as 0.2% by volume, in large volumes of waste or flue gases, which may be generated in volumes of 1,000,000 cubic feet per minute or greater. The sulfur oxides which are converted into sulfites and sulfates are readily precipitated from the scrubber-absorber system as crystals. The alkali used for absorption is regenerated electrolytically with the simultaneous formation of acid, hydrogen and oxygen. The acid is used to produce a marketable sulfur dioxide. The hydrogen and oxygen are also marketable as commercial products.

It is an object of the present invention to remove sulfur oxides from waste gas streams.

Another object is to recover sulfur dioxide from a waste gas stream in the form of a concentrated stream of gaseous sulfur dioxide.

A further object is to process waste gas streams such as flue gas, so that these streams may be discharged to the atmosphere without causing air contamination.

An additional object is to reduce sulfur oxides content in a waste gas stream to a low level, so that the waste gas stream complies with pollution control regulations and may be discharged to the atmosphere. Still another Another object is to concomitantly remove sulfur oxides and fuel ash from a flue gas stream.

Still a further object is to recover sulfur oxides from a waste gas stream in the form of alkali sulfite and sulfate.

An object is to convert alkali sulfite and sulfate, produced by the scrubbing of flue gas with alkali, into gaseous sulfur dioxide, sulfuric acid and recycle alkali hydroxide in an improved manner.

Another object is to absorb sulfur oxides from a waste gas, in an alkali absorbent, crystallize sulfites and sulfates, acidify sulfite to sulfur dioxide, and electrolytically regenerate the alkali absorbent.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented. Waste gas stream 1, typically consisting of a hot flue gas containing about 0.2% sulfur dioxide, a minor proportion of sulfur trioxide, and entrained fuel ash, is passed via conduit 2 into the converging inlet section 3 of a venturi gas scrubber, which is provided with a throat section 4 for concentrated gas-liquid contact and a divergent section 5 for the recovery of gas pressure drop. Scrubbing liquid stream 6, consisting essentially of an aqueous alkali solution, is passed via one or a plurality of nozzles 7 onto the inner surface of section 3, and flows downwards for contact with the waste gas stream 1 in section 4. Stream 6 will usually be at an initial temperature typically in the range of about 45° C. to 65° C., and will preferably contain dissolved sodium or potassium alkali, although other alkalis known to the art may be employed. When stream 6 contains dissolved alkali, it will be present in the solution in a concentration typically in the range of about 1 to 5 grams of dissolved alkali per 100 ml. of aqueous scrubbing solution.

Stream 6 is transversely projected into the downflowing high velocity gas phase at the throat section 4, and the liquid stream 6 is thereby dispersed into the gas stream in the form of liquid droplets, which wet and entrain fuel ash or other solids particles which may be present in the gas stream. In addition, as the mixture of gas phase and liquid droplets passes downwards through the diverging section 5 and chamber 8, a residence time is provided during which sulfur oxides are absorbed into the liquid droplets from the gas stream. The dissolved sulfur oxides react with the alkali in the liquid droplets to form alkali sulfite and alkali sulfate in solution.

The lower portion of chamber 8 provides a disengaging space, from which the scrubbed gas phase moves horizontally into gas removal duct 9. The cleaned waste gas stream 10 may now be discharged from duct 9 to atmosphere without causing air contamination. The liquid droplets collect in the bottom of chamber 8, from which the liquid stream 11 is removed. Stream 11 now contains dissolved alkali sulfite and sulfate as well as residual dissolved alkali and entrained fuel ash, and stream 11 may be at elevated temperature due to contact with waste gas stream 1, which may be produced from combustion processes where the gas temperatures are from 100° C. to 250° C. or higher. In most instances however, the temperature of stream 11 will be in the range of 45° C. to 65° C., with the actual magnitude of the temperature of stream 11 depending on the temperature and humidity of stream 1, and the vapor pressure of stream 6. Stream 11 is divided into streams 12 and 13. Stream 12 is recycled via stream 6 as will appear infra, and stream 13 is subjected to further processing in accordance with the present invention.

Stream 13 is passed to clarifier 14, which is a suitable apparatus or device for settling and removing entrained solid particles such as fuel ash from the liquid stream. The settled solids stream 15 is removed from unit 14 and is processed for waste disposal. The clarified liquid stream 16 discharged from unit 14 is passed to cooler-crystallizer 17, in which the liquid is cooled to a reduced temperature typically in the range of about 5° C. to 40° C., by heat exchange with a suitable fluid coolant such as cooling water which is circulated through coil 18. A portion of the dissolved alkali sulfite and sulfate is selectively precipitated or crystallized as a solid in unit 17, and the resulting process stream 19 is passed to settler-separator 20, in which the solid crystals are separated from the residual clear solution stream 21, which now contains residual alkali sulfite and sulfate, and which is recycled as will appear infra.

The solids stream 22 removed from unit 20 now consist of wet crystals of alkali sulfite and sulfate, which may be washed or otherwise suitably processed in means not shown, to remove entrained mother liquor. In most instances, stream 22 will consist of hydrated alkali sulfite and sulfate crystals, as the heptahydrate and hexahydrate respectively. Stream 22 is now processed in accordance with the present invention to produce concentrated gaseous sulfur dioxide, sulfuric acid and regenerated alkali compound such as alkali hydroxide for recycle to fortify stream 6. Stream 22 is passed into mixer-reactor 23, which contains a body of dilute anolyte solution consisting of an aqueous alkali sulfate-sulfuric acid solution. Unit 23 is provided with a stirrer or agitator 24, to assist in the dissolving of the solid crystals into the aqueous solution, which is passed into unit 23 via stream 25. The reaction in unit 23 between the sulfuric acid from stream 25 and the alkali sulfite from stream 22 results in the formation of gaseous sulfur dioxide ad further alkali sulfate in solution. The concentrated sulfur dioxide gas is removed from unit 23 via stream 26, which is purified in unit 27 to remove entrained liquid droplets etc. Unit 27 may consist of a suitable entrainment separator such as a baffled or cyclonic device, or a vessel provided with a mesh or other type of mist filter pad. The resulting purified sulfur dioxide gas stream 28 discharged from unit 27 may be passed to product utilization, or stream 28 may be compressed and liquefied in means not shown, to produce commercial liquid sulfur dioxide.

Returning to unit 23, an aqueous alkali sulfate solution is produced and withdrawn via stream 29, purified by a method such as crystallization and then passed into the central compartment 30 of an electrolytic mercury cathode cell. A portion of the alkali sulfate is electrolytically decomposed in unit 30, with the resultant formation of an aqueous anolyte solution at anode 3 containing sulfuric acid and residual alkali sulfate. The aqueous anolyte solution is withdrawn via stream 32, and passed into unit 33 for the removal of excess sulfuric acid, which will be formed in instances when stream 1 contains sulfur trioxide and stream 22 subsequently contains alkali sulfate, since in this case the material balance of the system will result in excess sulfate ions in the electrolytic cell. Unit 33 consists of any suitable system for the selective removal of sulfuric acid, such as a procedure in which alkali bisulfate is crystallized and alcohol is employed to separate out the constituent sulfuric acid and alkali sulfate. The separated excess sulfuric acid is withdrawn from unit 33 via stream 34, which is passed to product utilization or sales. The residual solution stream 25, consisting of aqueous anolyte solution of diminished sulfuric acid content, is utilized as described supra. In addition to anolyte solution 32, gaseous oxygen also forms at anode 31. The gaseous oxygen is withdrawn from anode 31 via stream 35 and passed to product sales.

The electrolytic cell 30 is also provided with mercury cathode compartment 36, which assimilates metallic alkali derived from alkali sulfate decomposition in a mercury amalgam. The resulting mercury-alkali metal amalgam is withdrawn from cathode 36 via stream 37, which is passed to amalgam decomposition unit 38 in which the amalgam is reacted with water stream 39. The alkali metal reacts with the water, and gaseous hydrogen stream 40 is produced and passed to product sales. The regenerated mercury stream 41 is produced in unit 38 is recycled in cathode compartment 36.

The reaction in unit 38 between alkali metal in the amalgam and water also produces an aqueous alkali hydroxide solution, which is withdrawn via stream 42 and passed into mixing and solution makeup tank 43, which is provided with a suitable stirrer or agitator 44 for mixing of the process streams. A makeup stream 45 which may consist of water, solid alkali carbonate or hydroxide, or an aqueous alkali carbonate or hydroxide solution, will also usually be passed into tank 43. The streams are mixed in tank 43, and the solids components are dissolved and uniformly mixed into the liquid phase. The resulting solution stream 46 is combined with stream 21 to form stream 47, and stream 47 is combined with oxidation inhibitor stream 48 and stream 12, to form stream 6. Stream 48 may consist of any suitable inhibitor for the prevention of sulfite oxidation, such as quinol, glycine or catechol.

Numerous alternatives within the scope of the present invention will occur to those skilled in the art. The ranges of operating variables such as temperature and solution concentration constitute preferred ranges of these variables for optimum utilization of the process concepts of the present invention, and the invention may be practiced outside of these ranges in suitable instances. Other means for gas-liquid contact may be provided instead of the venturi gas scrubber defined by sections 3, 4 and 5. Thus, in some instances, spray towers, packed towers or orifice scrubbers may be provided. Other known venturi configurations may be provided in practice, thus, section 3 may be provided with a lower horizontal lip which extends inwards and serves to project stream 6 transversely into the gas stream. As an alternative, nozzles 7 could be disposed transversely at section 4, to project stream 6 into the highly accelerated gas stream within section 4.

Stream 12 may be omitted in some instances, in which case all of stream 11 would be passed via stream 13 to unit 14 and subsequently to units 17 and 20. In instances when stream 1 is substantially free of entrained solid particles, unit 14 and its function may be omitted. Stream 22 may essentially consist solely of alkali sulfite, in instances when stream 1 is substantially free of sulfur trioxide. In this case, unit 33 and its function may be omitted. Stream 48 may alternatively be added via tank 43, and any suitable inhibitor for the prevention of sulfite oxidation may be provided via stream 48. In some instances, such as when stream 1 contains a substantial proportion of sulfur trioxide rather than sulfur dioxide, stream 48 may be omitted.

Other types of electrolytic cells, such as a permeable diaphragm or membrane cell, may be employed instead of a mercury cathode cell. In this case, the aqueous alkali hydroxide solution would be directly produced in the cell, without the generation of off-gas stream such as stream 35. Various types of mercury cathode cells known to the art may be employed in practice of the present invention, such as the Asahi-type cell in which the mercury flows through the cell as a thin liquid film.

An example of an industrial application of the process of the present invention to the flue gas stream discharged from a coal-burning power plant will now be described.

EXAMPLE

The process of the present invention was applied to the treatment of the flue gas discharged from a 400 MW coal-burning power station, which burned bituminous coal containing 2.5% sulfur and 10% ash, and discharged 27,750 cubic meters per minute of flue gas at 150° C., which contained 1,950 parts per million (p.p.m.) of sulfur dioxide and 172 grains of fly ash per standard cubic meter of gas before treatment. The final treated flue gas discharged to the stack contained 100 p.p.m. of sulfur dioxide and 3.44 grains of fly ash per standard cubic meter of treated flue gas.

Following are the operating conditions for principal process streams.

| Stream No. | Temperature, °C. | Flow rate | Composition or contents |
|---|---|---|---|
| 1 | 150 | 27,750 cubic meters/minute. | 1,950 p.p.m. sulfur dioxide, 172 grains fly ash/s.c.m. |
| 6 | 55 | 52,500 liters per minute. | 30 grams sodium carbonate per 100 ml. solution. |
| 10 | 55 | | 100 p.p.m. sulfur dioxide, 3.44 grains fly ash/s.c.m. |
| 13 | 55 | 2,230 liters/minute. | |
| 15 | | 335 tons/day | Fly ash. |
| 22 | | 624 tons/day | 89.8% sodium sulfite heptahydrate, 10.2% sodium sulfate decahydrate. |
| 28 | | 140 tons/day | 100% sulfur dioxide. |
| 29 | | 580 tons/day of contained sodium sulfate. | Aqueous solution. |
| 32 | | 606 liters per minute. | Aqueous sulfuric acid-sodium sulfate anolyte solution. |
| 34 | | 20 tons/day | Equivalent 100% sulfuric acid. |
| 35 | | 39 tons/day | 100% oxygen gas. |
| 40 | | 52,400 standard cubic meters/day. | 100% hydrogen gas. |
| 42 | | 195 tons/day | Equivalent 100% sodium hydroxide. |

We claim:

1. A process for the removal of sulfur dioxide from a waste gas stream and production of product concentrated sulfur dioxide, oxygen and hydrogen gas streams which comprises scrubbing said waste gas stream with an aqueous scrubbing solution, said aqueous scrubbing solution being at a temperature in the range of about 45° C. to 65° C. and containing a dissolved alkali, whereby sulfur dioxide is absorbed from said waste gas stream into said aqueous solution and the absorbed sulfur dioxide reacts with a portion of the alkali in said solution to form an alkali sulfite in solution without formation of alkali bisulfite, cooling the resulting solution containing dissolved alkali sulfite and residual dissolved alkali to a reduced temperature in the range of about 5° C. to 40° C. whereby solid alkali sulfite is precipitated, separating solid alkali sulfite from the residual solution, said residual solution containing residual dissolved alkali and being free of alkali bisulfite, adding a makeup alkali compound to said residual solution, recycling the resulting residual solution for further scrubbing of said waste gas stream, dissolving said solid alkali sulfite in an aqueous anolyte solution containing sulfuric acid and alkali sulfate, whereby said alkali sulfite reacts with sulfuric acid to form further alkali sulfate in solution and gaseous sulfur dioxide is liberated, withdrawing a product concentrated sulfur dioxide gas stream from the resulting aqueous alkali sulfate solution, electrolyzing said aqueous alkali sulfate solution in a mercury cathode electrolytic cell, whereby a mercury-alkali metal amalgam is produced at the cathode of said cell, and product free oxygen gas and an aqueous sulfuric acid-alkali sulfate solution are produced at the anode of said cell, recycling said aqueous sulfuric acid-alkali sulfate solution as said aqueous anolyte solution containing sulfuric acid and alkali sulfate, and decomposing said mercury-alkali metal amalgam by reaction with a stream of water, whereby product hydrogen gas and aqueous alkali hydroxide solution are formed, and regenerated mercury is formed for the cathode of said cell.

2. The process of claim 1, in which said waste gas stream is a flue gas.

3. The process of claim 2, in which said flue gas contains fuel ash, at least a portion of said fuel ash is entrained in said aqueous scrubbing solution, and the resulting aqueous scrubbing solution containing fuel ash and dissolved alkali sulfite is processed to remove fuel ash prior to cooling said resulting solution.

4. The process of claim 2, in which said flue gas contains sulfur dioxide and sulfur trioxide, said sulfur trioxide is absorbed in said aqueous scrubbing solution to form alkali sulfate in solution, said alkali sulfate is precipitated as a solid with said alkali sulfite by said cooling of said solution, whereby said alkali sulfate is dissolved in said aqueous anolyte solution and is subsequently electrolyzed, and the resulting aqueous anolyte solution produced by said electrolytic cell is processed to remove a portion of the contained sulfuric acid, prior to mixing with solid alkali sulfite.

5. The process of claim 1, in which said alkali is selected from the group consisting of sodium hydroxide and potassium hydroxide.

6. The process of claim 5, in which said aqueous scrubbing solution contains in the range of about 1 to 5 grams of dissolved alkali per 100 ml. of aqueous scrubbing solution.

7. The process of claim 1, in which said aqueous scrubbing solution contains an oxidation inhibitor.

8. The process of claim 1, in which said makeup alkali compound added to said residual solution comprises said aqueous alkali hydroxide solution.

9. A process for the removal of sulfur dioxide, sulfur trioxide and entrained fuel ash from a flue gas stream, and the production of product concentrated sulfur dioxide, oxygen and hydrogen gas streams and sulfuric acid which comprises scrubbing said flue gas stream with an aqueous scrubbing solution, said aqueous scrubbing solution being at a temperature in the range of about 45° C. to 65° C. and containing a dissolved alkali selected from the group consisting of sodium hydroxide and potassium hydroxide, whereby sulfur dioxide and sulfur trioxide are absorbed from said flue gas stream into said aqueous solution and the absorbed sulfur oxides react with a portion of the alkali in said solution to form alkali sulfite and alkali sulfate in solution without formation of alkali bisulfite, and at least a portion of said fuel ash is entrained in said aqueous scrubbing solution, processing the resulting solution to separate solid fuel ash from the liquid phase, cooling the resulting liquid solution containing dissolved alkali sulfite, alkali sulfate and residual dissolved alkali to a reduced temperature in the range of about 5° C. to 40° C., whereby solid alkali sulfite and solid alkali sulfate are precipitated, separating a solid mixture of alkali sulfite and sulfate from the residual solution, said residual solution containing residual dissolved alkali and being free of alkali bisulfite, adding a makeup alkali compound to said residual solution, recycling the resulting residual solution for further scrubbing of said flue gas stream, dissolving said solid mixture of alkali sulfite and sulfate in an aqueous anolyte solution containing sulfuric acid and alkali sulfate, whereby said alkali sulfite reacts with sulfuric acid to form further alkali sulfate in solution and gaseous sulfur dioxide is liberated, withdrawing a product concentrated sulfur dioxide gas stream from the resulting aqueous alkali sulfate solution, electrolyzing said aqueous alkali sulfate solution in a mercury cathode electrolytic cell, whereby a mercury-alkali metal amalgam is produced at the cathode of said cell, and product free oxygen gas and an aqueous sulfuric acid-alkali sulfate solution are produced at the anode of said cell, processing said aqueous sulfuric acid-alkali sulfate solution to remove a portion of the sulfuric acid content as product sulfuric acid, recycling the residual aqueous sulfuric acid-alkali sulfate solution as said aqueous anolyte solution containing sulfuric acid and alkali sulfate, and decomposing said and decomposing said mercury-alkali metal amalgam by reaction with a stream of water, whereby product hydrogen gas and aqueous alkali hydroxide solution are formed, and regenerated mercury is formed for the cathode of said cell.

10. The process of claim 9, in which said aqueous scrubbing solution contains in the range of about 1 to 5 grams of dissolved alkali carbonate per 100 ml. of aqueous scrubbing solution.

11. The process of claim 9, in which said aqueous scrubbing solution contains an oxidation inhibitor.

12. The process of claim 9, in which said makeup alkali compound added to said residual solution comprises said aqueous alkali hydroxide solution.